United States Patent [19]
Post

[11] Patent Number: 5,906,352
[45] Date of Patent: May 25, 1999

[54] CARTRIDGE CHECK VALVE

[75] Inventor: Karl-Heinz Post, Karst, Germany

[73] Assignee: Hyundai Electronics Industries Inc., Kyoungki-do, Rep. of Korea

[21] Appl. No.: 08/816,324

[22] Filed: Mar. 13, 1997

[30] Foreign Application Priority Data

Mar. 25, 1996 [LU] Luxembourg ............................. 88 732

[51] Int. Cl.⁶ .................................................. F16K 31/02
[52] U.S. Cl. ........................................ 251/44; 251/30.02
[58] Field of Search ........................... 251/33, 45, 30.02, 251/44

[56] References Cited

U.S. PATENT DOCUMENTS

| | | | |
|---|---|---|---|
| 4,073,464 | 2/1978 | Hansen et al. | 251/30.02 |
| 4,245,162 | 1/1981 | Grenier | 251/45 |
| 4,673,162 | 6/1987 | Lachmann | 251/30.02 |
| 5,048,790 | 9/1991 | Wells | 251/44 |

*Primary Examiner*—A. Michael Chambers
*Attorney, Agent, or Firm*—Gary M. Nath; Nath & Associates

[57] ABSTRACT

A two port cartridge valve comprises a valve sleeve with a two-step guide hole, a valve piston, which forms a closing element for a valve seat, and a piston shoulder, which divides the second step of the guide hole axially into an end-side first control chamber and an annular second control chamber. An auxiliary piston is fitted in an inner guide hole of the piston shoulder. The cross-section $A_s$ of the inner guide hole is the same size as or larger than the cross-section $A_c$ of the first step sealed by the valve piston. The piston shoulder forms an annular pressure area $A_X$ in the first control chamber. A connecting hole connects the inner guide hole to an orifice in the end face of the valve piston. The valve is used to achieve by means of the pressure to be shut off a hermetic shut-off function. It can be hydraulically locked and unlocked by a pilot valve.

21 Claims, 4 Drawing Sheets

CARTRIDGE CHECK VALVE

BACKGROUND OF THE INVENTION

The invention generally relates to a hydraulic valve, more specifically to a positive-seating cartridge check valve that can be hydraulically unlocked.

Such a cartridge check valve is a positive-seating two 2/2-way valve with a pilot operated non-return function. It blocks flow with minimum leakage and allows free flow when hydraulically unlocked. It is for example used to hermetically shut-off a working port of a hydraulic cylinder, in order to prevent creep movements of the piston when the latter is subjected to an external load. For implementing the shut-off function, such a valve shall use the pressure to be shut-off and not rely on an additional external pressure source.

Cartridge type 2/2-way valves have been widely used in hydraulic control systems as flow, directional and pressure-control valves for about 30 years. For a more detailed description of cartridge check valves it is for example referred to the article "Cartridge check valves: new option for hydraulic control" by David C. Downs, in "Machine Design", Vol. 52, No. 28 dated Dec. 11, 1980, Cleveland USA, pp. 143–147. A cartridge seat-type 2/2-way valve is likewise described in patent specification DE-A-36 19 927.

A standard cartridge seat-type 2/2-way valve comprises:
1) a valve sleeve for mounting in a control block with a front main flow connection A, a lateral main flow connection B and a valve seat between the main flow connections A and B;
2) a valve piston or poppet, which is fitted so as to be axially movable in a guide hole in the valve sleeve, its first end forming a closing cone for the valve seat;
3) a closing spring, which is assigned to the valve piston in such a way that it exerts a closing force on the latter in the direction of the valve seat, and
4) a valve cover, which closes the valve sleeve axially and delimits therein a control chamber, in which the other end of the valve piston forms a front control surface $A_X$.

FIG. 1 in the enclosed drawings shows a standard 2/2-way cartridge valve used as pilot operated non-return valve in a hydraulic circuit. To block the closing cone by the pressure $p_A$, i.e. the pressure to be shut off in connection A, the pressure $p_A$ is admitted to the control chamber via a controllable seat-type shuttle valve integrated in the valve cover. The valve piston is under equilibrium of forces, if the following equation is satisfied:

$$p_A A_A + p_B A_B = p_A A_X + F_{spring}$$

as $A_X \approx A_A + A_B$, the opening pressure $p_B$ is:

$$p_B = p_A + F_{spring}/A_B$$

To open the valve, the control pressure connection Y is pressurized, whereas the control pressure connection X is discharged to the tank. The shuttle valve in the valve cover now connects the unpressurized control chamber via the control pressure connection X to the tank. The pressure forces acting on the seat surface $A_A$ and the annular surface $A_B$ of the valve piston, push the latter against the spring force towards a stop on the valve cover and thus open the valve. An electromagnetically controlled seat-type 3/2-way valve can be used instead of the hydraulically controlled seat-type shuttle valve. In the shuttle valve, as well as in the 3/2-way valve, it must be ensured that no leakage occurs between control pressure connection C and Z2 on the one hand and the control pressure connection X on the other hand. Otherwise, satisfactory maintenance of pressure in connection A cannot be ensured. In the hydraulic circuit shown in FIG. 1, it is also disadvantageous that the closing against the pressure $p_A$, which is initiated by pressure relief of Y, is effected essentially by the closing spring. This leads indeed to undesirably long closing times.

An important improvement with regard to the closing time is achieved by the use of so-called actively controlled 2/2-way cartridge valves according to FIG. 2. The essential difference between the actively controlled 2/2-way cartridge valve according to FIG. 2 and a standard 2/2-way cartridge valve according to FIG. 1 is that the valve sleeve has a stepped guide hole for a valve piston with a shoulder with enlarged cross-section $A_X$. This shoulder of the valve piston delimits inside the guide hole an annular second control chamber, which is fluidically coupled to the control pressure connection Y. In this second control chamber the shoulder of the valve piston forms an additional annular control surface $A_Y$ acting in the opening direction. To block the closing cone by the pressure $p_A$, i.e. by the pressure to be shut off in connection A, the front control chamber must be exposed to a control pressure $p_X = p_A$ via a controllable seat-type shuttle valve, which is e.g. integrated in the valve cover, and the second control chamber must be discharged into the tank. Accordingly an additional hydrostatic force $p_A (A_X - A_C)$ supports the spring force during the closing movement. This active hydrostatic closing force enables the closing time to be reduced by a factor of 10 or more compared to the solution in FIG. 1. Because of the enlarged control surface $A_X$ and the resulting larger control oil volume, correspondingly large throughflows in the pilot multi-way valve are required to achieve short switching times. As in the solution according to FIG. 1 it must likewise be ensured in the solution according to FIG. 2 that no leakage occurs between control pressure connection C and Z2 on the one hand and control pressure connection X on the other hand.

With a pressureless second control chamber the valve piston closing the valve seat is under equilibrium of forces, if the following equation is satisfied:

$$p_A A_A + p_B A_B = p_A A_X + F_{spring}$$

The opening pressure $p_B$ is:

$$p_B = p_A (A_X - A_A)/A_B + F_{spring}/A_B$$

It will be appreciated that this pressure $p_B$ is substantially higher than in the valve in FIG. 1.

By application of pressure to the control surface $A_Y$ and pressure relief of the control surface $A_X$ the valve piston can be displaced actively towards the upper end stop.

A 2/2-way cartridge valve used as pilot-operated control valve is known from EP-A-0634577. The essential difference between this valve and the 2/2-way cartridge valve according to FIG. 2 is that a connecting duct through the valve sleeve links the annular second control chamber to the connection B. To shut off a pressure $p_A$ in connection A, the first control chamber is exposed to a control pressure $p_X = p_A$. The cross-section of the piston shoulder in the first control chamber, which is enlarged in relation to the cross-section of the valve seat, generates a hydrostatic closing force, which augments the closing force of the closing spring, so that the connection A is reliably shut off against the pressure $p_A$. As in the standard 2/2-way cartridge valve, essentially the closing spring is effective in the closing against the pressure $p_A$ in the connections A and B, which leads to undesirably long closing times. If, by contrast, the first control chamber is discharged into the tank, the preceding 2/2-way control valve opens at a corresponding pressure in the main flow connection A and/or B against the closing force of the closing spring and accordingly does not have a real shut-off direction.

A variant of the 2/2-way valve described above, which can be used as a non-return valve, either with blocking direction from connection B to connection A or with blocking direction from connection A to connection B, is likewise described in EP-A-0634577. If the 2/2-way valve described above is to be used as non-return valve with blocking direction from connection B to connection A, the first and second control chambers should be connected to each other via a hole through the piston shoulder. By contrast, a blocking direction form connection A to connection B is achieved, if the first control chamber is connected to the connection A via a hole in the valve piston. However, these non-return valves cannot be opened hydraulically.

SUMMARY OF THE INVENTION

The invention provides a cartridge valve with an improved hermetic shut-off function, which can be opened hydraulically. An essential difference between a two-way valve according to the invention and a two-way valve according to FIG. 2 is an auxiliary piston, which is fitted into an inner guide hole in the piston shoulder in such a way that the valve piston can be axially displaced in relation to the auxiliary piston and that this inner guide hole is axially sealed by the auxiliary piston. The cross-section $A_S$ of the inner guide hole is the same size as or larger than the sealed cross-section $A_C$ of the first stage of the stepped hole and the piston shoulder forms in the first control chamber an annular pressure area $A_X$. A connecting hole through the valve piston links the inner guide hole to an orifice in the end face of the valve piston. The pressure $p_A$ to be shut off can build up directly in the inner guide hole, which is hermetically sealed by the auxiliary piston. This pressure generates a hydrostatic blocking force, which acts in the closing direction on the valve piston, is proportional to the area $(A_S-A_A)$ and assists the blocking force of the spring. If $A_C=A_S$, the valve piston is compensated hydrostatically during the closing process and the closing spring does not have to overcome a pressure force. If $A_C<A_S$, a hydrostatic closing force $p_A (A_S-A_C)$, which assists the closing spring, acts on the valve piston during the closing process. Admission of pressure to the first control chamber generates an additional hydrostatic closing force and thus, for example, substantially increases the closing speed or hydrostatic blocking force. As the piston shoulder forms only an annular pressure area $A_X$ in the first control chamber, the control oil consumption for axial displacement of the valve piston in the closing direction is smaller than in the valve type according to FIG. 2. By contrast a hydrostatic opening force for reliable opening of the valve can be generated by admission of pressure to the second control chamber.

A hydraulically pilot operated cartridge valve with a low pressure loss in the valve seat is obtained, by selecting a sealed cross-section $A_C$ of the first step in the stepped hole that is about the same or only insignificantly larger than the sealed cross-section $A_A$ of the valve seat. As no non-return valve function can be achieved with this valve, it is used, for example, in hydraulic control systems, in which the opening is effected exclusively by a multi-way pilot valve, which controls the first and second control chambers.

A hydraulically pilot operated valve with the function of a non-return valve with flow direction from B to A is obtained, if the sealed cross-section $A_C$ of the first step of the stepped hole is larger by an annular area $A_B$ than the sealed cross-section $A_A$ of the valve seat, so that the valve opens at a specified pressure differential $p_B-p_A>0$.

The closing spring is advantageously clamped between the valve piston and auxiliary piston and the auxiliary piston is pressed by the closing spring against the valve cover. The auxiliary piston is secured to the valve cover with radial and axial play in such a way that it has the required freedom of movement for self-centering in the inner guide hole. Accordingly no expensive multiple fits on the valve piston are required. The auxiliary piston can automatically center itself with the valve piston axis both in the case of pressure admission to the inner guide hole and pressure admission to the first control chamber.

DETAILED DESCRIPTION

Figure 3:
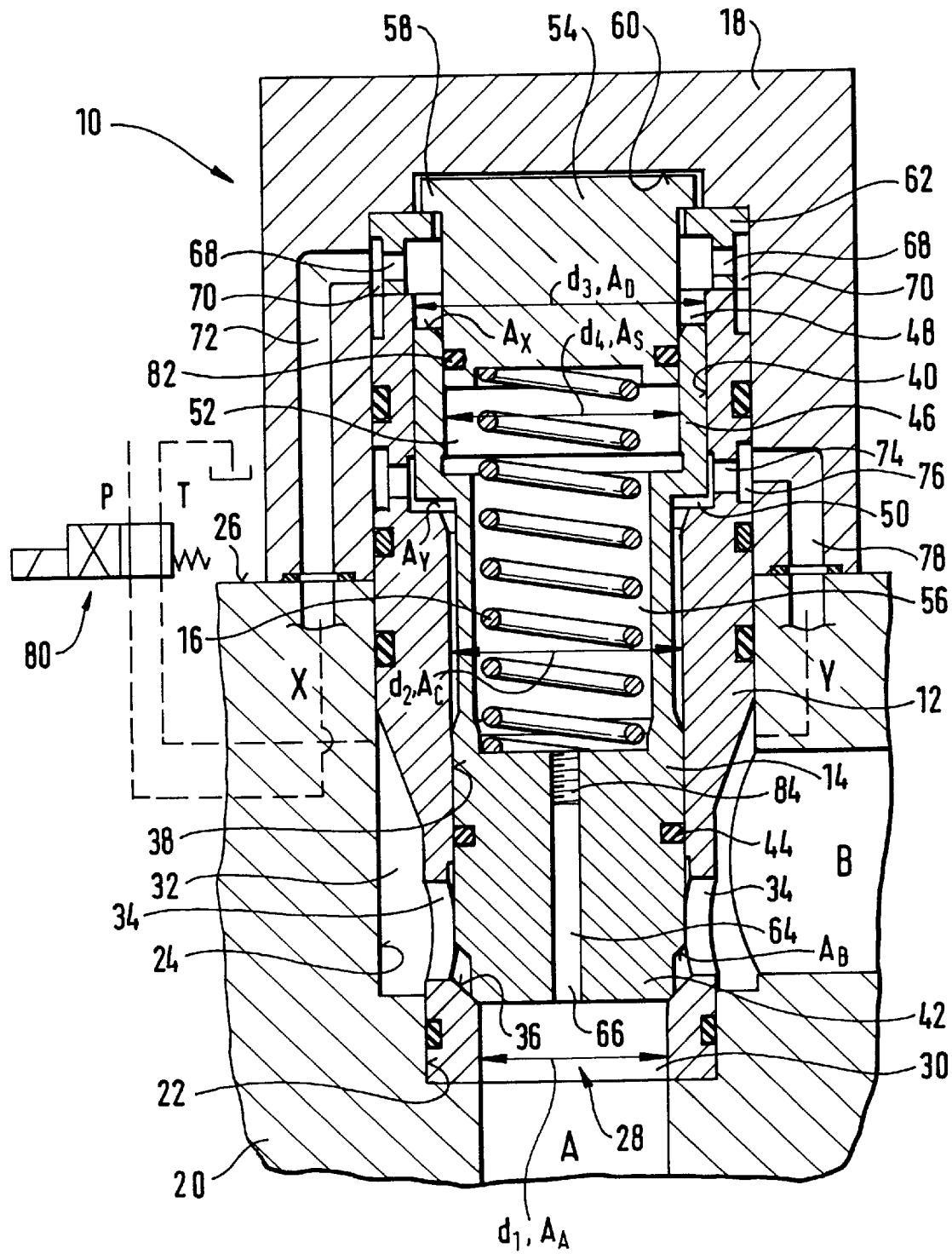
FIG. 3 presents a longitudinal sectional view of a first embodiment of a two-port cartridge valve constructed in accordance with the principles of the present invention; the valve being used as a hydraulically pilot operated valve with the function of a non-return valve with direction of flow from B to A.

The basic construction of a two port cartridge valve according to the invention is described on the basis of FIG. 3. The valve 10 comprises essentially a valve sleeve 12, a valve piston 14, a closing spring 16 and a valve cover 18. The lower part of the valve sleeve 12 is sealed into a stepped hole 22, 24 of a manifold or control block 20. A first main flow connection A leads coaxially into the first hole step 22 in the control block 20. A second main flow connection B leads laterally into the second hole step 24 in the control block 20. The upper part of the valve sleeve 12 is sealed into a hole in the valve cover 18. The latter is secured on a connection surface 26 of the control block 20.

An axial first main flow opening 28 (also designated main flow opening A) is located in the first end of the valve sleeve 12 and is extended into the valve sleeve 12 by an axial main flow duct 30. In the second hole step 24 of the control block 20 the valve sleeve 12 delimits an annular chamber 32, which is connected via lateral main flow openings 34 (also designated main flow opening B) in the valve sleeve 12 to the main flow duct 30. A valve seat 36 with seat bevel is arranged between the axial first main flow opening 28 and the lateral second main flow openings 34 in the main flow duct 30.

A first guide hole 38 for the valve piston 14 extends above the main flow openings 34 towards the second end of the valve sleeve 12. It extends axially through a second guide hole 40 with a substantially larger cross-section to the second end of the valve sleeve 12.

Figure 1:
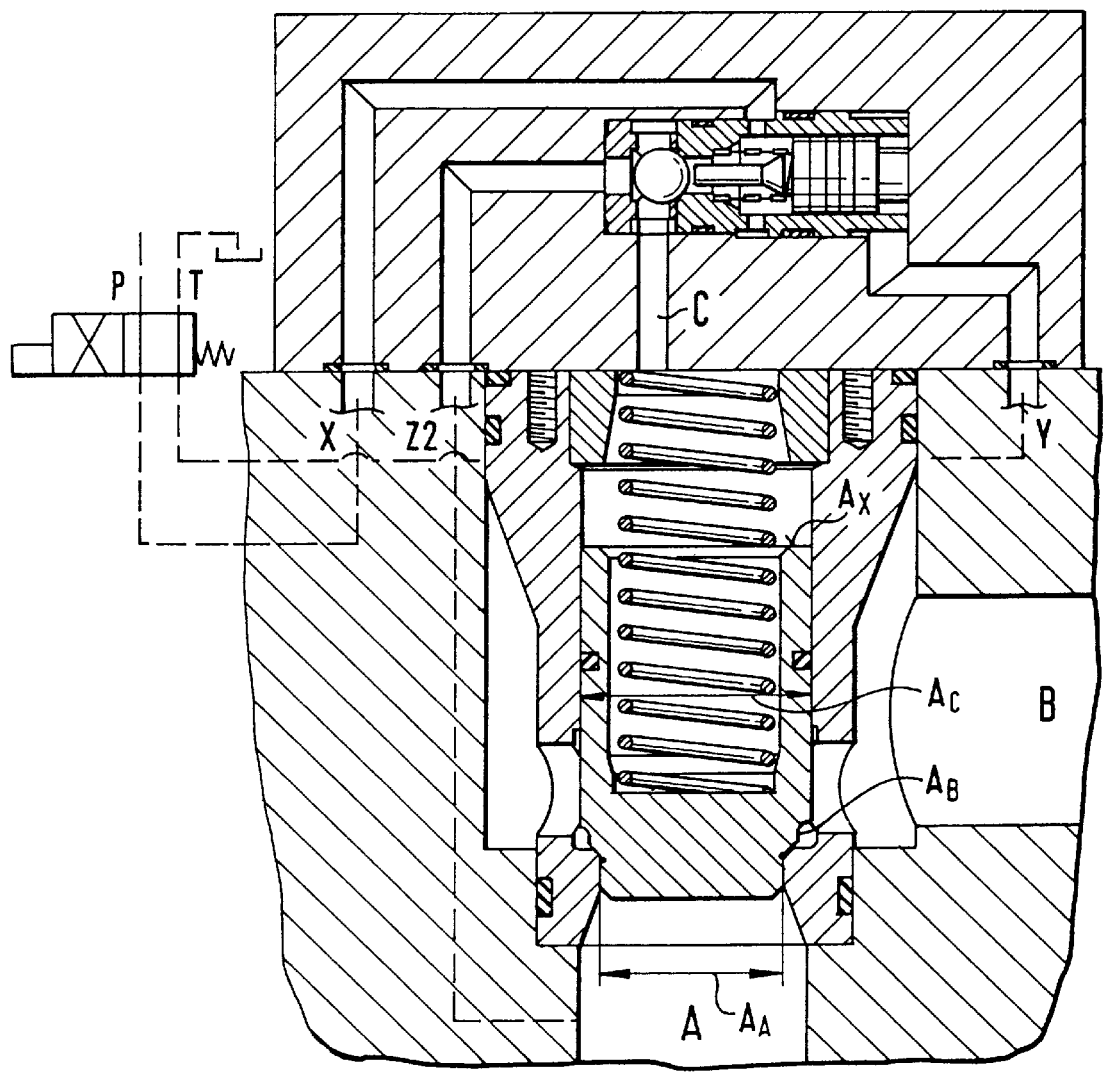
FIG. 1 illustrates the state of the art described above; it shows a longitudinal sectional view of a standard two port cartridge valve, used as hydraulically pilot operated non-return valve in a hydraulic circuit.

The valve piston 14 is designed as a stepped piston, which is fitted so as to be axially movable in the stepped hole of the valve sleeve 12. The end of the valve piston 14 facing the valve seat 36 forms a closing element 42 for the valve seat 36. The cross-section $A_A$ entered in the figure is the cross-section of the valve seat 36, which is sealed by the closing element 42 towards the main flow opening A. In the first guide hole 38 the piston is sealed by a sealing element 44. In FIG. 1 the cross-section $A_C$ sealed in the first guide hole 38 is larger than the sealed cross-section $A_A$ of the valve seat 36 by the annular area $A_B$.

At its second end the valve piston 14 has a shoulder 46, which divides the second step 40 of the guide hole axially into a first control chamber 48 and a second control chamber 50. This second step 40 may have an approx. 60–100% larger cross-section than the first step 38. The maximum cross-section extension is determined by the minimum wall thickness of the valve sleeve 12. In FIG. 1 the sealed cross-section of the second step 40 is designated $A_D$.

The piston shoulder 46 has an inner guide hole 52, into which an auxiliary piston 54 is fitted in such a way that the valve piston 14 can be displaced axially in relation to the auxiliary piston 54 and that the inner guide hole 52 is sealed axially by the auxiliary piston 54. The cross-section $A_S$ of this inner guide hole 52 sealed by the auxiliary piston 54 is the same size as or, depending on the application, slightly larger than the cross-section $A_C$ sealed by the valve piston 14.

The closing spring 16 is assigned to the valve piston 14 in such a way that it exerts a closing force on the latter in the direction of the valve seat 36. This closing spring 16 is advantageously clamped between valve piston 14 and auxiliary piston 54, so that the latter is pressed by the closing spring 16 against the valve cover 18 and rests on the latter. To enable a sufficiently long closing spring 16 to be housed in the valve piston 14, the inner guide hole 52 is extended towards closing element 42 by a spring chamber 56. The auxiliary piston 54 has a cylindrical shoulder 58 which is fitted with radial play in a cylindrical chamber 60 of the valve cover 18 and is secured by an annular flange 62 with axial play in the cylindrical chamber 60. The annular flange 62 itself is clamped between valve cover 18 and valve sleeve 12. With this method of securing the auxiliary piston 54 to the valve cover 18 the auxiliary piston 54 has freedom of movement for self-centering in the inner guide hole 52.

A connecting hole 64 through the valve piston 14 links the inner guide hole 52 hydraulically to a central orifice 66 in the end face of the closing element 42, so that pressure equalization always takes place between guide chamber 52 and main flow connection A.

In the first control chamber 48 the piston shoulder 46 forms an annular pressure area $A_X$ acting in the closing direction, whereby $A_X=A_D-A_S$. This first control chamber 48 is linked to a first control pressure connection 72 in the valve cover 18 via connecting holes 68 in the annular flange 62 and an annular duct 70. This first control pressure connection 72 is designated "control pressure connection X" below.

In the second control chamber 50 the piston shoulder 46 forms an annular pressure area Ay acting in the opening direction, wherein $A_Y=A_D-A_C$. This second control chamber 50 is linked to a second control pressure connection 78 in the valve cover 18 via connecting holes 74 in the valve sleeve 12 and an annular duct 76. This second control pressure connection 78 is designated "control pressure connection Y" below. In FIG. 3 the piston shoulder 46 seals the two control chambers 48 and 50 metallically from each other, but a sealing element could also be interposed between guide chamber 52 and piston shoulder 46. However, a hermetic seal between the two control chambers 48 and 50 is not required in most cases. The control pressure connections X and Y are linked via block holes to a corresponding pilot valve, e.g. a 4/2-way control valve 80, which likewise does not have to meet any special requirements with regard to the leakage between the individual connections.

When the control pressure connections X and Y are without pressure, the valve 10 in FIG. 3 operates as non-return valve with flow direction from B to A. The pressure $p_A$ in the main flow connection A generates a hydrostatic closing force $p_A (A_S-A_A)$, which blocks the valve from A to B, because $A_S>A_A$. The valve piston 14 is pressed all the more firmly against the valve seat 36, the higher the pressure $p_A$. A sealing element 82 hermetically seals the auxiliary piston 54 in the inner guide hole 52 and thus prevents pressure reduction via the control pressure connection X. The valve piston 14 is blocked automatically by the direct pressure equalization between connection A and the inner guide chamber 52. In contrast to the circuits in FIGS. 1 and 2, no seat valve need be provided as control valve 80, because leakage in the control valve 80 no longer exerts an effect on maintenance of pressure in connection A.

If control chambers 48 and 50 are without pressure, the valve piston 14 closing the valve 36 is under equilibrium of forces, if the following equation is satisfied:

$$p_A A_A + p_B A_B = p_A A_S + F_{spring}$$

The opening pressure $p_B$ is thus:

$$p_B = p_A(A_S-A_A)/A_B + F_{spring}/A_B$$

Figure 2:
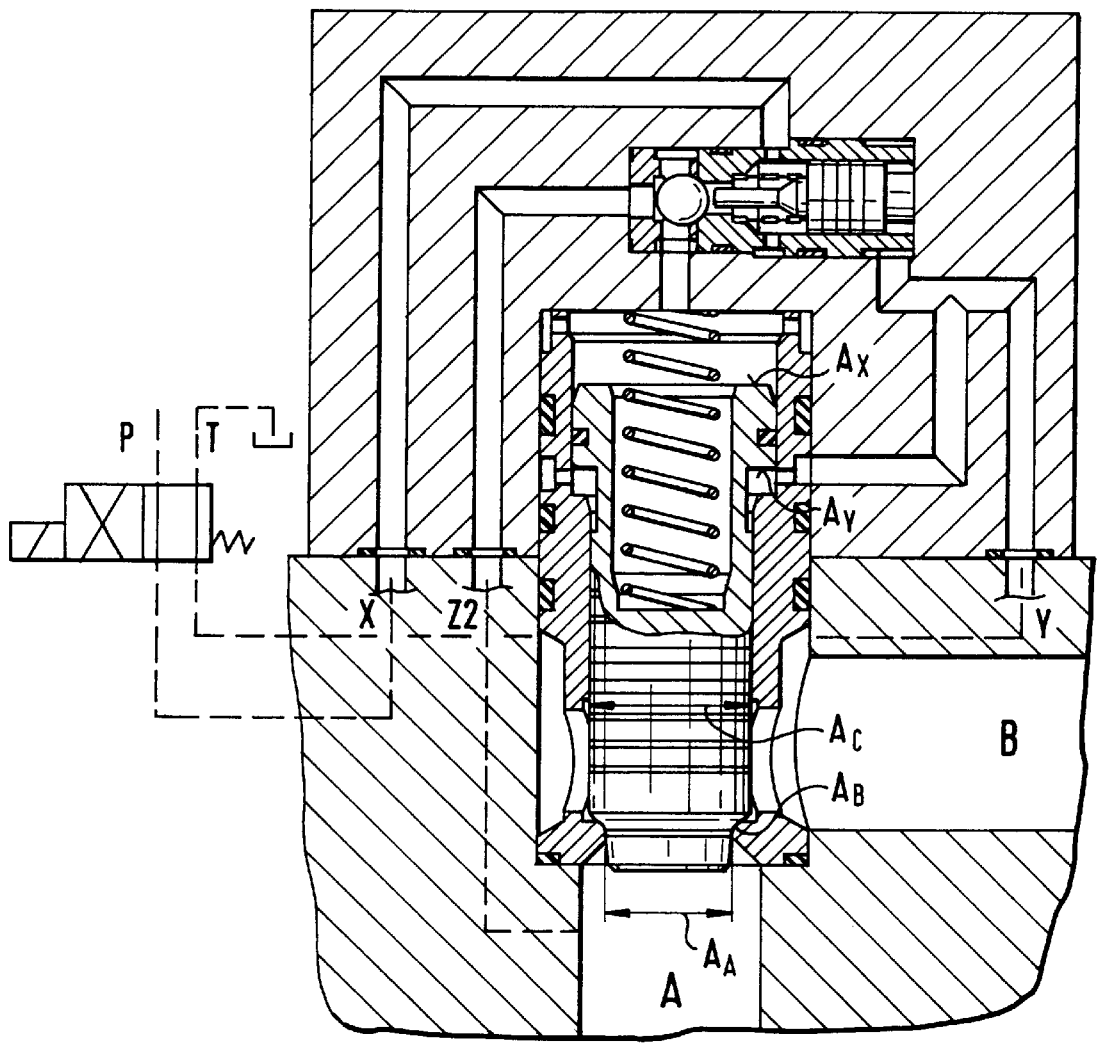
FIG. 2 illustrates the state of the art described above; it shows a longitudinal sectional view of an actively controlled two port cartridge valve, used as hydraulically pilot operated non-return valve in a hydraulic circuit.

This opening pressure is always smaller than the opening pressure in the valve in FIG. 2, because $A_S<A_D$.

If $A_S \approx A_C \approx A_A+A_B$:

$$p_B \approx p_A + F_{spring}/A_B,$$

i.e. the opening pressure is approximately the same as the opening pressure in the valve in FIG. 1.

If $p_A=0$, the valve piston 14 is urged exclusively by the closing spring 16 against the valve sent 36. The opening pressure PB in the main flow connection B is in this case: $p_B=F_{spring}./A_B$.

In contrast to conventional hydraulically pilot operated non-return valves, the valve according to FIG. 3 can be blocked in both directions of flow by admission of pressure to the control pressure connection X and relief of the control pressure connection Y to the tank. The control pressure $P_X$ acts on the annular surface $A_X$ in the first control chamber 48 and builds up an additional, hydrostatically acting closing force. To prevent the auxiliary piston 54 running into the inner guide hole 52 at a control pressure $p_X$ higher than $p_A$, this axial movement is prevented by the annular flange 62. Consequently, only the annular surface $A_X$ is effective and the control oil volume is clearly reduced compared to the state of the art, which results in shorter closing times or smaller control throughflows, i.e. smaller control valves. Without annular flange 62, the auxiliary piston 54 would run into the inner guide hole 52 of valve piston 14 as far as the stop at a control pressure $p_X$ higher than $p_A$ and likewise assist the closing movement. Consequently a lower control pressure $p_X$ would be required, but the control oil volume would increase to the same values as in the actively controlled 2/2-way cartridge valve shown in FIG. 2.

The valve is controlled hydraulically by admission of pressure to the control pressure connection Y and discharge of the control pressure connection X into the tank. The following equation corresponds to equilibrium of forces at the valve piston 14:

$$p_Y A_Y + p_A A_A + p_B A_B = p_A A_S + F_{spring} \Rightarrow$$

$$p_Y A_Y = p_A (A_S - A_A) - p_B A_B + F_{spring},$$

i.e. if $p_B = 0$ and $n = (A_S - A_A)/A_Y$: $\Rightarrow$ $$p_Y = p_A / n + F_{spring} / A_Y$$

The area ratio "n" is can be approximately three or even greater than three, so that the valve can be controlled with a pressure $p_Y$ lower than $p_A$.

To avoid abrupt opening of valve 10 during control and thus prevent expansion knocking, a nozzle can be screwed into the connecting hole 64 through the valve piston 14. For this purpose this connecting hole 64 advantageously has an inner thread 84. Such a nozzle likewise slows down the closing movement of valve piston 14.

The 2/2-way cartridge valve shown in FIG. 3 thus has all the necessary functions of a hydraulically pilot operated non-return valve in an ideal way. With the same outside dimensions the free flow cross-sections are substantially larger compared to prior art hydraulically pilot operated non-return valves. It follows that with the same pressure losses correspondingly higher throughflows can thus be achieved. In addition extended functions such as blocking and full opening for both directions of flow are possible. The control pressure connections can be connected to simple leakage-susceptible spool-type pilot valves, so that seat-type valves are no longer required in the pilot circuit. Furthermore the change in volume of the first control chamber when the valve is opened and closed is substantially smaller than in the actively controlled valve shown in FIG. 2, so that smaller control oil volumes are required for active blocking of the valve.

Figure 4:
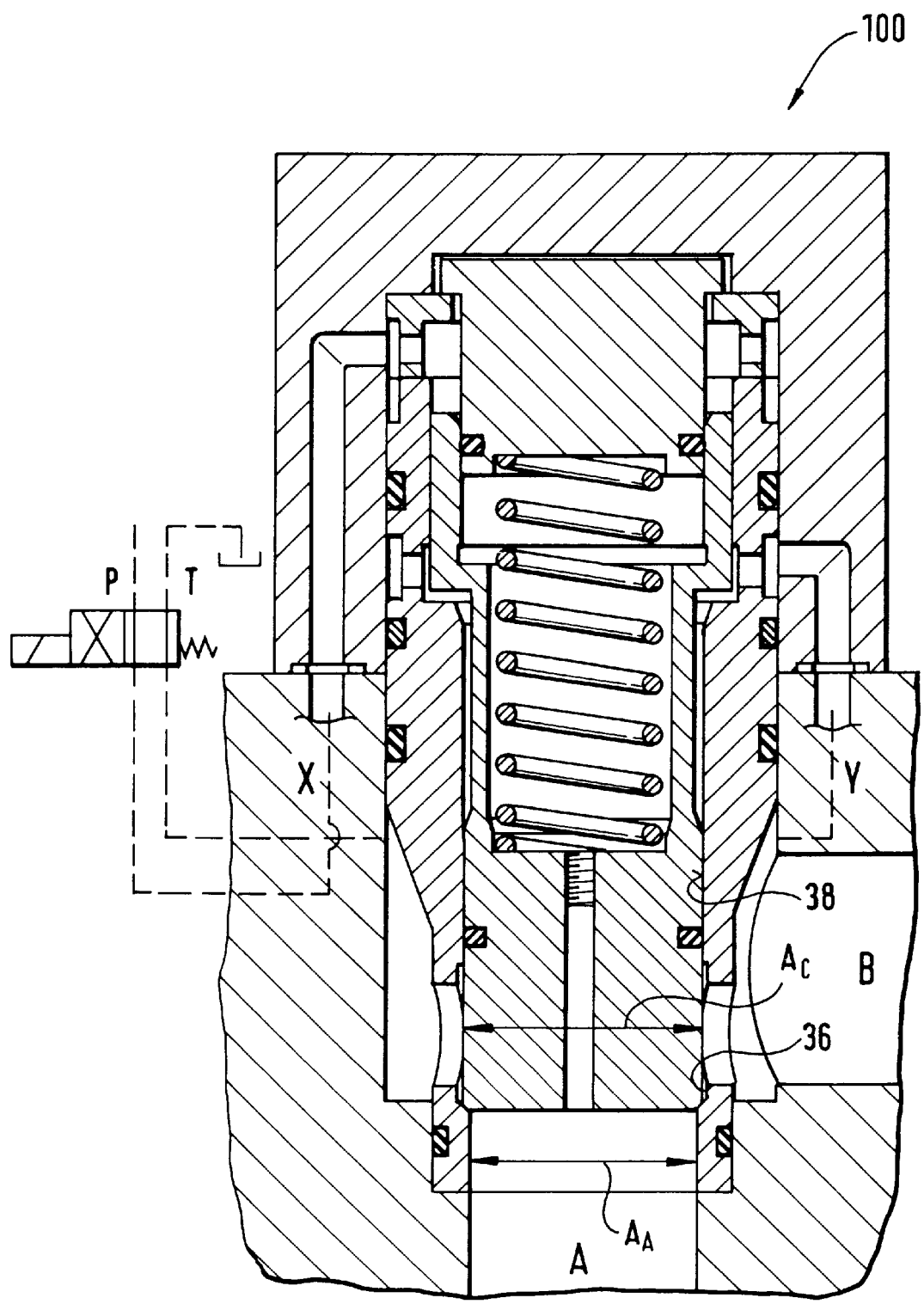
FIG. 4 presents a longitudinal sectional view of a second embodiment of a two-port cartridge valve constructed in accordance with the principles of the present invention; the valve being used as a hydraulically pilot operated valve without the function of a non-return valve with direction of flow from B to A.

The main difference between the 2/2-way cartridge valve 100 in FIG. 4 and the cartridge multi-way valve 10 in FIG. 3 is that in FIG. 4 the annular area $A_B$ is zero or negligibly small. In other words the cross-section $A_C$ sealed in the first guide hole 38 is approximately the same size as the sealed cross-section $A_A$ of valve seat 36. It follows that the 2/2-way cartridge valve shown in FIG. 4 no longer fulfills the function of a non-return valve with flow direction from B to A.

In contradistinction to the valve in FIG. 3 the seat cross-section $A_A$ of the valve in FIG. 4 is enlarged approximately to the area $A_C$. This enlarged seat cross-section $A_A$ results either in substantially reduced flow resistance or in larger throughflows with a specified pressure differential. The valve shown in FIG. 4 may be used for example in hydraulic control systems, in which operating positions "open" or "closed" of the valve are to be determined by an electromagnetic directional pilot valve. The valve of FIG. 4 has otherwise essentially the same advantages as those described above for the valve in FIG. 3.

What is claimed is:
1. Cartridge valve comprising:
   a) a valve sleeve having:
      a first and second end;
      an axial mainflow duct
      a first main flow opening leading at the first end of said valve sleeve into said axial mainflow duct;
      a second mainflow opening leading laterally into said main flow duct;
      a valve seat between the first and second main flow opening; and
      a stepped guide hole having a first step and a second step;
   b) a valve piston which is fitted in said stepped guide hole so as to be axially movable therein and to seal a cross section $A_C$ in said first step, said valve piston having:
      a first and second end;
      a closing element for the valve seat disposed at the first end of the valve piston, said closing element being capable of sealing a cross section $A_A$ in the valve seat, said closing element having an end face which is exposed to pressure in said first main flow opening when said closing element seals said cross section $A_A$ in the valve seat, wherein the sealed cross-section $A_C$ of the first step of the stepped guide hole is about the same size as the sealed cross-section $A_A$ of the valve seat;
      a piston shoulder disposed at the second end of valve piston so as to divide the second step of the guide hole axially into an end-side first control chamber and an annular second control chamber, said piston shoulder sealing a cross-section $A_D$ in the second step (40) of the stepped hole, said sealed cross-section $A_D$ being larger than said sealed cross-section $A_C$;
      an inner guide hole in said piston shoulder; and
      a connecting hole through the valve piston which connects said inner guide hole to an orifice in said end face of the valve piston;
   c) a closing spring which cooperates with the valve piston in such a way that it exerts a closing force on the latter in the direction of the valve seat;
   d) a valve cover which cooperates with the valve sleeve in such a way that it axially closes the second control chamber;
   e) an auxiliary piston which is fitted in said inner guide hole of the piston shoulder in such a way that the valve piston can be moved axially in relation to the auxiliary piston,
      wherein the auxiliary piston seals a cross-section $A_S$ in the inner guide hole which is about the same size as or larger than the sealed cross-section $A_C$ of the first step of the stepped hole, and the piston shoulder forms an annular pressure area $A_X$ in the first control chamber.

2. The valve of claim 1, wherein the sealed cross-section $A_C$ of the first step of the stepped guide hole is slightly larger than the sealed cross-section $A_A$ of the valve seat.

3. The valve of claim 1 including:
   first connecting means for fluidically coupling said first control chamber to a control pressure source; and
   second connecting means for fluidically coupling said second control chamber to a control pressure source.

4. The valve of claim 1, wherein the closing spring is clamped in the inner guide hole between the valve piston and the auxiliary piston, and the auxiliary piston is urged by the closing spring against the valve cover.

5. The valve of claim 1, wherein the auxiliary piston is secured with radial and axial play to the valve cover in such a way that it has the required freedom of movement for self-centering in the inner guide hole.

6. The valve of claim 5, wherein the auxiliary piston has a cylindrical shoulder, and the valve cover a cylindrical chamber, said cylindrical shoulder being fitted with radial play in said cylindrical chamber.

7. The valve of claim 6, including an annular flange for axially securing said cylindrical shoulder of said auxiliary piston in said cylindrical chamber of the valve cover.

8. The valve of claim 7, wherein the annular flange is clamped between valve cover and valve sleeve.

9. The valve of claim 1, wherein the connecting hole through the valve piston has an inner thread for a screw-in nozzle.

10. The valve of claim 9, including a screw-in nozzle in the connecting hole through the valve piston.

11. The valve of claim 1, wherein the area ratio $$n=(A_S-A_A)/A_Y$$

is approximately three or greater than three, wherein $A_Y=A_D-A_C$.

12. The valve of claim 1, wherein the connecting hole through the valve piston has an inner thread for a screw-in nozzle.

13. The valve of claim 12, including a screw-in nozzle in the connecting hole through the valve piston.

14. The valve of claim 1, wherein the area ratio $$n=(A_S-A_A)/A_Y$$

is approximately three or greater than three, wherein $A_Y=A_D-A_C$.

15. Cartridge valve comprising:
 a) a valve sleeve having:
  a first and second end;
  an axial mainflow duct
  a first main flow opening leading at the first end of said valve sleeve into said axial mainflow duct;
  a second mainflow opening leading laterally into said main flow duct;
  a valve seat between the first and second main flow opening; and
  a stepped guide hole having a first step and a second step;
 b) a valve piston which is fitted in said stepped guide hole so as to be axially movable therein and to seal a cross section $A_C$ in said first step, said valve piston having:
  a first and second end;
  a closing element for the valve seat disposed at the first end of the valve piston, said closing element being capable of sealing a cross section $A_A$ in the valve seat, said closing element having an end face which is exposed to pressure in said first main flow opening when said closing element seals said cross section $A_A$ in the valve seat, wherein the sealed cross-section $A_C$ of the first step of the stepped hole is larger than the sealed cross-section $A_A$ of the valve seat by an annular area $A_B$, so that the valve opens at a predetermined pressure differential between the first and second main flow openings;
  a piston shoulder disposed at the second end of valve piston so as to divide the second step of the guide hole axially into an end-side first control chamber and an annular second control chamber, said piston shoulder sealing a cross-section $A_D$ in the second step (40) of the stepped hole, said sealed cross-section $A_D$ being larger than said sealed cross-section $A_C$;
  an inner guide hole in said piston shoulder; and
  a connecting hole through the valve piston which connects said inner guide hole to an orifice in said end face of the valve piston;
 c) a closing spring which cooperates with the valve piston in such a way that it exerts a closing force on the latter in the direction of the valve seat;
 d) a valve cover which cooperates with the valve sleeve in such a way that it axially closes the second control chamber;
 e) an auxiliary piston which is fitted in said inner guide hole of the piston shoulder in such a way that the valve piston can be moved axially in relation to the auxiliary piston,
  wherein the auxiliary piston seals a cross-section $A_S$ in the inner guide hole which is about the same size as or larger than the sealed cross-section $A_C$ of the first step of the stepped hole, and the piston shoulder forms an annular pressure area $A_X$ in the first control chamber.

16. The valve of claim 15 including:
first connecting means for fluidically coupling said first control chamber to a control pressure source; and
second connecting means for fluidically coupling said second control chamber to a control pressure source.

17. The valve of claim 15, wherein the closing spring is clamped in the inner guide hole between the valve piston and the auxiliary piston, and the auxiliary piston is urged by the closing spring against the valve cover.

18. The valve of claim 15, wherein the auxiliary piston is secured with radial and axial play to the valve cover in such a way that it has the required freedom of movement for self-centering in the inner guide hole.

19. The valve of claim 18, wherein the auxiliary piston has a cylindrical shoulder, and the valve cover a cylindrical chamber, said cylindrical shoulder being fitted with radial play in said cylindrical chamber.

20. The valve of claim 19, including an annular flange for axially securing said cylindrical shoulder of said auxiliary piston in said cylindrical chamber of the valve cover.

21. The valve of claim 20, wherein the annular flange is clamped between valve cover and valve sleeve.

* * * * *

UNITED STATES PATENT AND TRADEMARK OFFICE
CERTIFICATE OF CORRECTION

PATENT NO. : 5,906,352
DATED : May 25, 1999
INVENTOR(S) : Karl-Heinz POST

It is certified that error appears in the above-indentified patent and that said Letters Patent is hereby corrected as shown below:

On the title page, item [73] should read: --HYDROLUX, S.a.r.l., Aclerle, Luxembourg--

Signed and Sealed this

Twenty-sixth Day of October, 1999

Attest:

Q. TODD DICKINSON

*Attesting Officer*          *Acting Commissioner of Patents and Trademarks*